(12) United States Patent
Amano

(10) Patent No.: US 10,040,321 B2
(45) Date of Patent: Aug. 7, 2018

(54) TIRE AND TIRE PRINT METHOD

(71) Applicant: BRIDGESTONE CORPORATION, Chuo-ku, Tokyo (JP)

(72) Inventor: Tomoyuki Amano, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 238 days.

(21) Appl. No.: 14/891,769

(22) PCT Filed: May 9, 2014

(86) PCT No.: PCT/JP2014/002477
§ 371 (c)(1),
(2) Date: Nov. 17, 2015

(87) PCT Pub. No.: WO2014/203444
PCT Pub. Date: Dec. 24, 2014

(65) Prior Publication Data
US 2016/0121660 A1    May 5, 2016

(30) Foreign Application Priority Data

Jun. 21, 2013  (JP) .................................. 2013-130765

(51) Int. Cl.
*B60C 13/00*   (2006.01)
*B60C 13/04*   (2006.01)

(52) U.S. Cl.
CPC ............ *B60C 13/001* (2013.01); *B60C 13/04* (2013.01); *B60C 2013/045* (2013.01)

(58) Field of Classification Search
CPC ........ B60C 13/00; B60C 13/001; B60C 13/04
See application file for complete search history.

(56) References Cited

U.S. PATENT DOCUMENTS 7,232,498 B2 * 6/2007 Zimmer ................. B29D 30/72
                                                        152/523
7,316,473 B2 * 1/2008 Matsuzawa ............ B41J 2/2114
                                                         347/100

FOREIGN PATENT DOCUMENTS

| CN | 1575965 A | 2/2005 |
| CN | 1741913 A | 3/2006 |
| EP | 1493598 A1 | 1/2005 |
| GB | 2381367 | * 4/2003 |
| JP | 2003-118297 A | 4/2003 |

(Continued)

OTHER PUBLICATIONS

Jul. 8, 2014, International Search Report issued in International Patent Application No. PCT/JP2014/002477.

(Continued)

*Primary Examiner* — Justin R Fischer
(74) *Attorney, Agent, or Firm* — Kenja IP Law PC

(57) ABSTRACT

A tire 10 includes a decorative portion 15 formed by using paint on a surface of a side portion 12. The decorative portion 15 includes a white-paint layer 16 and a color-paint layer 17. The white-paint layer is formed by using a white paint in at least a portion of the decorative portion 15. The color-paint layer is formed on the white-paint layer 16 in an overlapping manner by using a color paint in color different from the white paint. A ratio of a paint area of the white-paint layer 16 per unit area of a paint surface is at least 68%. The ratio of the paint area of the white-paint layer 16 is greater than a ratio of a paint area of the color-paint layer 17.

19 Claims, 1 Drawing Sheet

(56) References Cited

FOREIGN PATENT DOCUMENTS

| | | |
|---|---|---|
| JP | 2005-022644 A | 1/2005 |
| JP | 2010125440 A | 6/2010 |
| JP | 2012-061922 A | 3/2012 |
| JP | 2012-136024 A | 7/2012 |
| WO | 2004/065140 A1 | 8/2004 |

OTHER PUBLICATIONS

Nov. 19, 2013, Notice of Reasons for Refusal issued by the Japan Patent Office in the corresponding Japanese Patent Application No. 2013-130765.

\* cited by examiner

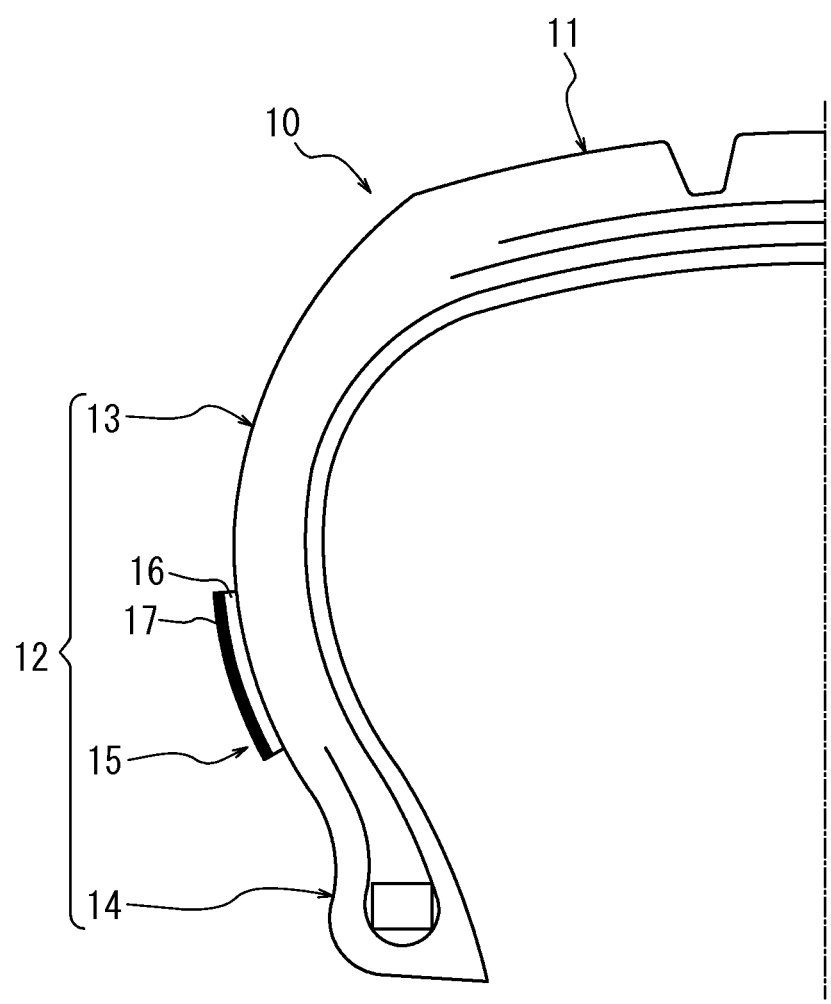

TIRE AND TIRE PRINT METHOD

CROSS REFERENCE TO RELATED APPLICATION

This application claims priority to and the benefit of Japanese Patent Application No. 2013-130765 filed on Jun. 21, 2013, the entire contents of which are incorporated herein by reference.

TECHNICAL FIELD

This disclosure relates to a tire and a tire print method.

BACKGROUND

Conventionally, a mark and the like are formed on a surface of a side portion of a tire. Although it is desirable that the mark have high visibility and coloring property, it has been difficult to form the mark and the like having high visibility and coloring property because of black color of a base color of the tire. Therefore, in order to improve the visibility of the mark, it has been proposed to form a colored region in color different from the base color of the tire and form, in the colored region, the mark in color different from the color of the colored region in an overlapping manner (see PLT 1).

CITATION LIST

Patent Literature

PLT 1: JP-A-2012-61922

SUMMARY

Technical Problem

The PLT 1 may improve the visibility and the coloring property by increasing an amount of ink used. However, in order to obtain required coloring property, it is necessary to increase thicknesses of the colored region and the mark. Increase in the thicknesses of the colored region and the mark causes distortion of the tire to converge in the colored region and the mark, possibly generating a crack in the colored region and the mark. Therefore, it has been required to improve the coloring property while maintaining crack resistance.

In consideration of the above condition, it could be helpful to provide a tire having a decorative portion with improved coloring property while maintaining the crack resistance, and also to provide a tire print method capable of improving the coloring property while maintaining the crack resistance of the decorative portion.

Solution to Problem

In order to solve the above problem, a tire of the disclosure herein includes a decorative portion formed by using paint on a surface of a side portion, wherein the decorative portion has a white-paint layer made of a white paint formed in at least a portion of the decorative portion and a color-paint layer made of a color paint in color different from the white paint and formed on the white-paint layer in an overlapping manner, and a ratio of a paint area of the white-paint layer per unit area of a paint surface is at least 68% and, also, the ratio of the paint area of the white-paint layer is greater than a ratio of a paint area of the color-paint layer. Thereby, the coloring property of the decorative portion may be improved while crack resistance is maintained.

In the tire, preferably, a thickness of the while-paint layer is greater than a thickness of the color-paint layer. Note that the thicknesses of the color-paint layer and the white-paint layer refer to thicknesses at respective maximum thickness locations in the decorative portion. Thereby, the crack resistance may be further easily maintained, and the coloring property may be further improved.

In the tire, preferably, the thickness of the while-paint layer is 95 μm or less. Thereby, the crack resistance may be further easily maintained.

In the tire, preferably, a ratio of the thickness of the white-paint layer to the thickness of the color-paint layer is greater than 1 and equal to or smaller than 10. Thereby, the coloring property is sufficiently improved, and the crack resistance may be further easily maintained.

In the tire, preferably, the ratio of the paint area of the white-paint layer is at least 90%. Thereby, the coloring property may be further improved, and the crack resistance may be further easily maintained.

In the tire, preferably, the white-paint layer is formed by printing the white paint employing an inkjet method, and a gap between dots of the white paint formed by the inkjet method is 20 μm or less. Note that the gap between the dots refers to a maximum gap between outer edges of the dots. Thereby, further sufficient coloring property may be obtained.

A tire print method of the disclosure herein is a tire print method of printing a decorative portion on a surface of a side portion of a tire by using paint, the tire print method includes: a forming step of forming a white-paint layer by using a white paint in at least a portion of the decorative portion in such a manner that a ratio of a paint area of the white-paint layer per unit area of a paint surface becomes at least 68%; and an overlapping-formation step of forming a color-paint layer on the white-paint layer in an overlapping manner by using a color paint in color different from the white paint, in such a manner that a ratio of a paint area of the color-paint layer is smaller than the ratio of the paint area of the white-paint layer formed at the forming step. Thereby, a tire having a decorative portion with improved coloring property while maintaining the crack resistance may be obtained.

Advantageous Effect

The tire and the tire print method of the disclosure herein designed as described above may improve the coloring property of the decorative portion while maintaining the crack resistance.

BRIEF DESCRIPTION OF THE DRAWING

In the accompanying drawing:

FIG. 1 is a cross-sectional diagram of a tire in a width direction according to one embodiment.

DETAILED DESCRIPTION

Hereinafter, an embodiment of the disclosure herein will be described with reference to the accompanying drawing.

First, a tire according to one embodiment will be described. FIG. 1 is a cross-sectional diagram of the tire in a tire width direction according to the present embodiment.

As illustrated in FIG. 1, a tire 10 includes a tread portion 11 and a side portion 12. The tread portion 11 comes into contact with a road surface. The side portion 12 includes a sidewall portion 13 and a bead portion 14. More specifically, the side portion 12 is a region from an outer edge of a tread surface in the tire width direction to a rim fitting portion of the bead portion 14.

The tire 10 of the present embodiment includes, on the side portion 12, a decorative portion 15 that displays a mark or a decoration formed by using a white paint and a paint in another color. The decorative portion 15, at least partially, includes a white-paint layer 16 and a color-paint layer 17 formed on the white-paint layer 16 in an overlapping manner. The decorative portion 15 may be either continuous or discontinuous along a circumferential direction of the side portion 12, or formed in a portion of the side portion 12. Further, the decorative portion 15 may be made up of a portion alone having the white-paint layer 16 and the color-paint layer 17 formed thereon in the overlapping manner, or partially includes this portion. Note that, in FIG. 1, for the sake of easy understanding, the white-paint layer 16 and the color-paint layer 17 have exaggerated thicknesses.

The white-paint layer 16 is formed by using the white paint in at least a portion of the decorative portion 15. The white-paint layer 16 may be formed, for example, by printing employing an inkjet method to spray fine white paint over an entire paint surface of a spray target. A ratio of a paint area needs to be at least 68% and is preferably at least 90%. The paint surface refers to a region to which the paint is sprayed excluding a region where the paint cannot be sprayed, taking a broad view. The ratio of the paint area refers to a ratio of the paint area to an area of the paint surface, that is, a total paint area of the fine white paint per unit area of the paint surface. The ratio of the paint area of the white-paint layer 16 needs to be greater than a ratio of a paint area of the color-paint layer 17. Also, a thickness of the white-paint layer 16 is preferably greater than a thickness of the color-paint layer 17. A ratio of the thickness of the white-paint layer 16 to the thickness of the color-paint layer 17 is preferably greater than 1 and equal to or smaller than 10. Here, the thicknesses of the color-paint layer 17 and the white-paint layer 16 refer to thicknesses at respective maximum thickness locations in the decorative portion 15. Also, the thickness of the white-paint layer 16 is preferably 95 μm or less. A gap between dots of the fine white paint constituting the white-paint layer 16 is preferably 20 μm or less. The gap between the dots refers to a maximum space between outer edges of adjacent dots in numerous dots. Also, the white-paint layer 16 may be either directly formed on a surface of the side portion 12 or formed via a primer or the like.

The color-paint layer 17 is formed on the white-paint layer 16 in the overlapping manner by using the color paint in color different from the white paint. The color-paint layer 17 may be formed, for example, by printing employing the inkjet method to spray fine color paint over the entire paint surface of the spray target on the white-paint layer 16. By using the color-paint layer 17, for example, the mark or the decoration is formed on the white-paint layer 16. Note that the color-paint layer 17 may be either directly formed on the surface of the white-paint layer 16 or formed via another layer or the like.

The white paint and the color paint according to the present embodiment may be, for example, a UV ink containing a photoinitiator, an oligomer, a monomer, and a colorant as main components in which, as necessary, an ultraviolet absorber, an antioxidant, a light stabilizer, a adhesion promoter, a rheology agent, and a dispersant are blended.

Next, a tire print method according to one embodiment for forming the tire of the present embodiment as described above will be described. First, the white paint is printed on the surface of the side portion 12 of the tire either directly or via a painted primer, by employing, for example, the inkjet method. For example, dot density is adjusted in printing the white paint in such a manner that the ratio of the paint area becomes 68% or more. By printing the white paint, the surface of the side portion 12 of the tire is coated with the white paint, thereby forming the white-paint layer 16 (a forming step).

The color paint is printed either directly or via another layer on the white-paint layer 16 by employing, for example, the inkjet method. In printing the color paint, for example, the dot density is adjusted in such a manner that the ratio of the paint area of the color-paint layer 17 becomes smaller than the ratio of the paint area of the white-paint layer 16. By printing the color paint, the color-paint layer 17 is formed on the white-paint layer 16 in the overlapping manner (an overlapping-formation step).

According to the tire of the present embodiment designed as described above, since the ratio of the paint area of the white-paint layer 16 is at least 68%, dullness generated in the decorative portion 15 by a base color of the tire 10 under the white-paint layer 16 may be suppressed and, as a result, the coloring property may be improved. According to the tire of the present embodiment, also, since the ratio of the paint area of the white-paint layer 16 is greater than the ratio of the paint area of the color-paint layer 17, the white-paint layer 16 under the color-paint layer 17 is partially exposed, thereby further improving the coloring property of the color-paint layer 17. According to the tire of the present embodiment, further, since the coloring property may be improved by adjusting the ratios of the paint areas of the white-paint layer 16 and the color-paint layer 17 as described above, there is no necessity to excessively increase at least one of the thicknesses of the white-paint layer 16 and the thickness of the color-paint layer 17 for the purpose of improving the coloring property. Therefore, the crack resistance may be maintained.

Further, since the thickness of the white-paint layer 16 is greater than the thickness of the color-paint layer 17, the coloring property of the color-paint layer 17 may be further improved. Also, since the thickness of the white-paint layer 16 is greater than the thickness of the color-paint layer 17, the crack resistance may be further easily maintained as described as follows. That is, during running, the tire is deformed causing distortion of the side portion 12, which possibly causes a crack in the decorative portion 15. Although there is a tendency that, in the color-paint layer 17 with a smaller ratio of the paint area, the distortion converges between the dots, since the thickness of the white-paint layer 16 having the color-paint layer 17 formed thereon is greater than the thickness of the color-paint layer 17, the distortion in the decorative portion 15 converges in the white-paint layer 16 with a greater ratio of the paint area and higher crack resistance, rather than in the color-paint layer 17. Therefore, the crack resistance may be further easily maintained.

Also, since the thickness of the white-paint layer 16 is 95 μm or less, the crack resistance of the white-paint layer 16 may be further easily maintained.

Also, since the ratio of the thickness of the white-paint layer 16 to the thickness of the color-paint layer 17 is 10 or less, deterioration in the crack resistance of the white-paint layer 16 due to an excessive increase in the thickness may be suppressed, and thus the crack resistance may be further easily maintained. When this ratio exceeds 10, the coloring property of the color-paint layer 17 cannot be improved effectively. Therefore, in order also to suppress an amount of the white paint, this ratio is preferably kept at 10 or less.

Also, since the ratio of the paint area of the white-paint layer 16 is 90% or more, the dullness generated in the decorative portion 15 by the base color of the tire 10 under the white-paint layer 16 is further suppressed and, as a result, the coloring property may be further improved. Also, since the ratio of the paint area of the white-paint layer 16 is 90% or more, the gap between the dots of the fine white paint becomes very small, and the crack resistance may be further easily maintained.

Further, since the white-paint layer 16 is formed by printing employing the inkjet method and the gap between <Coloring Property Evaluation Test>

The tires of Comparative Examples 1 and 2 and Examples 1 to 10 were observed by 20 observers who then answered a questionnaire survey of three-level evaluation of the coloring property of the color-paint layer 17. The three-level evaluation was aggregated, and thus the coloring property was evaluated. Results of the evaluation are illustrated in Table 1. In Table 1, C refers to the coloring property that is evaluated as good in the three-level evaluation by less than 10 observers out of the 20 observers, B refers to the coloring property that is evaluated as good by 10 to 14 observes, and A refers to the coloring property that is evaluated as good by 15 or more observers. Note that required coloring property is performance to obtain A or B in the evaluation.

TABLE 1

| | | Comparative Example 1 | Comparative Example 2 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Ratio of paint area [%] | White-paint layer | 65 | 70 | 90 | 90 | 85 | 70 | 68 | 70 | 90 | 90 | 90 | 90 |
| | Color-paint layer | 50 | 80 | 50 | 50 | 50 | 50 | 50 | 50 | 50 | 50 | 50 | 50 |
| Thickness [nm] | White-paint layer | 40 | 40 | 40 | 80 | 40 | 40 | 40 | 20 | 95 | 100 | 200 | 240 |
| | Color-paint layer | 20 | 20 | 20 | 20 | 20 | 20 | 20 | 40 | 20 | 20 | 20 | 20 |
| Thickness of white-paint layer/Thickness of color-paint layer | | 2 | 2 | 2 | 4 | 2 | 2 | 2 | 0.5 | 4.5 | 5 | 10 | 12 |
| Presence of crack in 10000 km test | | No | No | No | No | No | No | No | No | No | No | No | No |
| Presence of crack in 30000 km test | | No | Yes | No | No | No | No | No | No | No | Yes | Yes | Yes |
| Coloring property | | C | C | A | A | A | B | B | B | A | A | A | A | the dots of the fine white paint is 20 μm or less, sufficient coloring property may be obtained.

Examples

Next, tires of the disclosure herein were experimentally produced and subjected to performance evaluation of the crack resistance and the coloring property as described below. With specifications illustrated in Table 1, tires of Comparative Examples 1 and 2 and Examples 1 to 10 were experimentally produced; the tires were of 195/65R in size having the side portion 12 with the white-paint layer 16 and the color-paint layer 17 formed thereon by using UV curable inks (Miyama Paint, Inc.) as the white paint and the color paint. The crack resistance and the coloring property of each of the tires of Comparative Examples 1 and 2 and Examples 1 to 10 were evaluated in a manner described below. Results are illustrated in Table 1.

<Crack Resistance Evaluation Test>

The tires of Comparative Examples 1 and 2 and Examples 1 to 10 were mounted on a rim of 6JJ in size (a JATMA standard rim), filled with an internal air at 240 kPa (a maximum air pressure of JATMA standard), and subjected to a drum test (a 10000 km test) to run for 10000 km at a drum speed of 60 km/h having a drum load of 615 kg (a JATMA maximum load) applied thereto. Also, the drum test for 30000 km (a 30000 km test) was conducted with the same conditions as those of the 10000 km test. After applying the drum load, the presence of the crack in an overlapping portion of the white-paint layer 16 and the color-paint layer 17 was visually determined following the 10000 km test and the 30000 km test, and thus the crack resistance was evaluated. Results of the evaluation are illustrated in Table 1. Note that required crack resistance is performance not to generate the crack in the 10000 km test.

As illustrated in Table 1, the tires of Examples 1 to 10 did not generate the crack in the 10000 km test. Therefore, it can be seen that, when the ratio of the paint area of the white-paint layer 16 is 68% or more and also greater than the ratio of the paint area of the color-paint layer 17, the tires of Comparative Examples 1 and 2 could have also maintained the crack resistance.

Also, in the 30000 km test, the tires of Examples 8 to 10 generated the crack, while the tires of Examples 1, 2 and 7 did not generate the crack. Therefore, it can be seen that, when the thickness of the white-paint layer 16 is 95 μm or less, the crack resistance may be further easily maintained.

As illustrated in Table 1, also, the tires of Examples 1 to 10 have better coloring property than that of the tires of Comparative Examples 1 and 2.

Further, the coloring property of the tires of Examples 4 and 5 was evaluated as B, and the coloring property of the tires of Examples 1 and 3 was evaluated as A. Therefore, it can be seen that the coloring property may be improved when the ratio of the paint area of the white-paint layer 16 is at least 85% or more, and may be more reliably improved when the ratio of the paint area of the white-paint layer 16 is 90% or more.

10 tire
11 tread portion
12 side portion
13 sidewall portion
14 bead portion
15 decorative portion
16 white-paint layer
17 color-paint layer

The invention claimed is:
1. A tire comprising:
a decorative portion formed by using paint on a surface of a side portion, wherein the decorative portion has a white-paint layer formed by dots of a white paint applied in at least a portion of the decorative portion and a color-paint layer formed by dots of a color paint in color different from the white paint and applied on the white-paint layer in an overlapping manner, a ratio of a paint area of the white-paint layer per unit area of a paint surface is at least 68%, and the ratio of the paint area of the white-paint layer is greater than a ratio of a paint area of the color-paint layer to partially expose the white-paint layer under the color-paint layer, where the paint surface is a region to which the paint is applied, taking a broad view, and the ratio of the paint area is a total area of the dots per unit area of the paint surface.

2. The tire according to claim 1, wherein a thickness of the white-paint layer is greater than a thickness of the color-paint layer.

3. The tire according to claim 2, wherein the thickness of the white-paint layer is 95 μm or less.

4. The tire according to claim 2, wherein a ratio of the thickness of the white-paint layer to the thickness of the color-paint layer is greater than 1 and equal to or smaller than 10.

5. The tire according to claim 2, wherein the ratio of the paint area of the white-paint layer is at least 90%.

6. The tire according to claim 2, wherein the white-paint layer is formed by printing the white paint employing an inkjet method, and a gap between dots of the white paint formed by the inkjet method is 20 μm or less.

7. The tire according to claim 1, wherein the thickness of the white-paint layer is 95 μm or less.

8. The tire according to claim 7, wherein a ratio of the thickness of the white-paint layer to the thickness of the color-paint layer is greater than 1 and equal to or smaller than 10.

9. The tire according to claim 7, wherein the ratio of the paint area of the white-paint layer is at least 90%.

10. The tire according to claim 7, wherein the white-paint layer is formed by printing the white paint employing an inkjet method, and a gap between dots of the white paint formed by the inkjet method is 20 μm or less.

11. The tire according to claim 1, wherein a ratio of the thickness of the white-paint layer to the thickness of the color-paint layer is greater than 1 and equal to or smaller than 10.

12. The tire according to claim 11, wherein the ratio of the paint area of the white-paint layer is at least 90%.

13. The tire according to claim 11, wherein the white-paint layer is formed by printing the white paint employing an inkjet method, and a gap between dots of the white paint formed by the inkjet method is 20 μm or less.

14. The tire according to claim 1, wherein the ratio of the paint area of the white-paint layer is at least 90%.

15. The tire according to claim 14, wherein the white-paint layer is formed by printing the white paint employing an inkjet method, and a gap between dots of the white paint formed by the inkjet method is 20 μm or less.

16. The tire according to claim 1, wherein the white-paint layer is formed by printing the white paint employing an inkjet method, and a gap between the dots of the white paint formed by the inkjet method is 20 μm or less.

17. The tire according to claim 1, wherein each of the white paint and the color pint is a UV ink.

18. The tire according to claim 1, wherein the surface of the side portion is provided with a mark or a decoration, and the color-paint layer constitutes the mark or the decoration.

19. A tire print method of printing a decorative portion on a surface of a side portion of a tire by using paint, the tire print method comprising:

a forming step of forming a white-paint layer by inkjet printing a white paint in at least a portion of the decorative portion in such a manner that a ratio of a paint area of the white-paint layer per unit area of a paint surface becomes at least 68%; and an overlapping-formation step of forming a color-paint layer on the white-paint layer in an overlapping manner by inkjet printing a color paint in color different from the white paint, in such a manner that a ratio of a paint area of the color-paint layer is smaller than the ratio of the paint area of the white-paint layer formed at the forming step, where the paint surface is a region to which the paint is applied, taking a broad view, and the ratio of the paint area is a total area of the dots per unit area of the paint surface.

* * * * *